Figure 1:
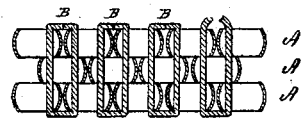

E. N. FOOTE.

Improvement in the Manufacture of Ornamental Chains.

No. 128,381. Patented June 25, 1872.

Witnesses.
Socrates Scholfield
Gardner C. Wright

Inventor: Edward N. Foote

UNITED STATES PATENT OFFICE.

EDWARD N. FOOTE, OF NORTHAMPTON, ASSIGNOR TO BENJAMIN S. FREEMAN, JOSEPH J. FREEMAN, AND HENRY F. BARROWS, OF ATTLEBOROUGH, MASSACHUSETTS.

IMPROVEMENT IN THE MANUFACTURE OF ORNAMENTAL CHAINS.

Specification forming part of Letters Patent No. 128,381, dated June 25, 1872.

*To all whom it may concern:*

Be it known that I, EDWARD N. FOOTE, of Northampton, in the county of Hampshire and State of Massachusetts, have invented a new and useful Improvement in the Construction of Ornamental Chains; and I do hereby declare that the following specification, taken in connection with the drawing making a part of the same, is a full, clear, and exact description thereof.

Figure 2:
Figure 3:
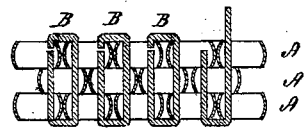

Figure 1 is a longitudinal sectional elevation of a piece of chain composed of circular beads or rings placed side by side and held together by wire staples, upon which the links are strung, the staples having their ends abutting at one edge of the chain and soldered at the joint. Fig. 2 is an edge view of the chain enlarged. Fig. 3 exhibits a chain similar to that shown at Fig. 1, with the exception that the staples are combined with the chain so as to hold the links in the manner which constitutes my invention.

My invention consists in securing the ends of the staples upon which the links are strung by making one or both limbs of the staple of a greater length than sufficient to enable them to meet to form a joint, as in the old method, and long enough to enable the ends of such limbs to be bent over the edge of the link and down into the next adjoining row of links, and, by thus clinching such ends, mechanically secure the several rows of links, and dispense with the labor and cost of soldering the staples at the joint, and avoid the discoloration incident to such operation and the expense of removing the same.

In the drawing it will be seen that the chain is composed of a series of metallic annular beads, A, placed in rows parallel with each other, the several rows composing the chain being placed so that the edges of the links in one row meet in the lines of the centers of the links in the next adjacent rows. The several rows of links are held together, so as to form a chain, by means of wire staples B, which staples, as previously stated, are, by the old method of manufacturing the chain, made to abut at one edge of the chain and soldered at the joint *a*, while by my improvement, as shown at Fig. 3, one leg of the staple is of sufficient length to admit of being bent over and locked into the next transverse row of links.

It is obvious that both legs of the staple may be extended and be bent and clinched in opposite directions, if preferred; but ordinarily it will be found quite sufficient to bend over and clinch one only of the legs.

What I claim as my invention, and desire to secure by Letters Patent, is—

Fastening the staples B, upon which the links A of a bead-chain are strung, by bending the ends of the staples over and locking them into the chain, substantially as described, for the purposes specified.

EDWARD N. FOOTE.

Witnesses:
 A. PERRY PECK,
 WILLIAM LYMAN.